United States Patent [19]

Tsui

[11] Patent Number: 5,405,210
[45] Date of Patent: Apr. 11, 1995

[54] HOIST RING ASSEMBLY AND METHOD

[75] Inventor: Gary Tsui, San Gabriel, Calif.

[73] Assignee: CBC Industries, Inc., Commerce, Calif.

[21] Appl. No.: 969,972

[22] Filed: Nov. 2, 1992

[51] Int. Cl.$^6$ ............................................. F16G 15/08
[52] U.S. Cl. ..................................... 403/119; 403/78; 403/79; 403/165
[58] Field of Search .................... 72/352; 294/1.1; 403/119, 79, 78, 165, 164

[56] References Cited

U.S. PATENT DOCUMENTS

| 1,553,060 | 9/1925 | Anderson | 72/352 X |
| 4,641,986 | 2/1987 | Tsui et al. | 403/164 |

FOREIGN PATENT DOCUMENTS 3435961  4/1986  Germany .................. 294/1.1

Primary Examiner—Randolph A. Reese
Assistant Examiner—Christopher J. Novosad
Attorney, Agent, or Firm—Beehler & Pavitt

[57] ABSTRACT

A hoist ring assembly where the mating parts on the hoist ring member and the retainer member are formed by forging and are assembled in the as forged condition.

12 Claims, 3 Drawing Sheets

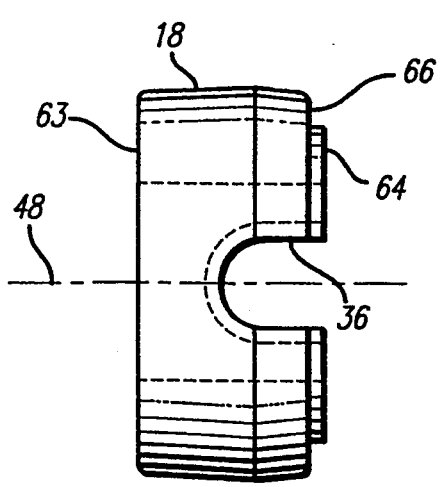
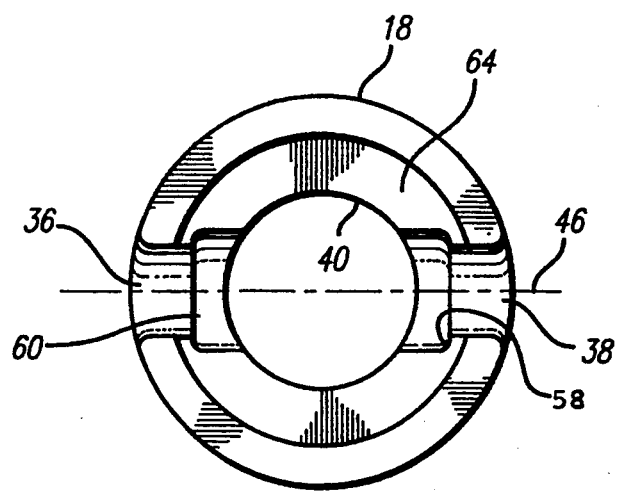
FIG. 7  FIG. 8
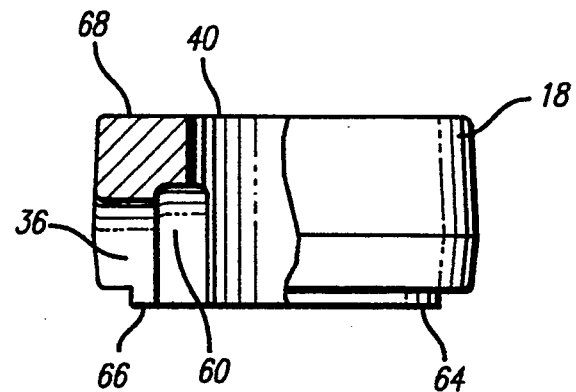
FIG. 9
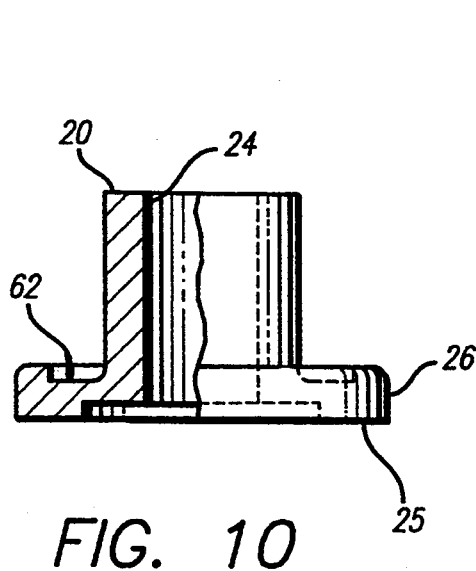
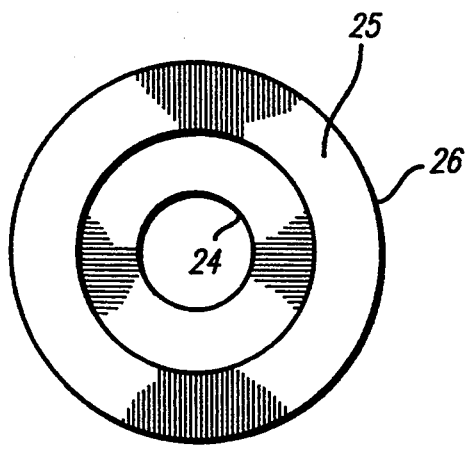
FIG. 10  FIG. 11

HOIST RING ASSEMBLY AND METHOD

BACKGROUND OF THE INVENTION

1. Field of the Invention

The invention relates in general to hoist ring assemblies and, in particular, to hoist ring assemblies which are largely formed by forging and are assembled as forged.

2. Description of the Prior Art

Hoist rings have been widely used in industry to provide attachment points on heavy objects so that tools such as hoists, cranes and jacks may be applied to lift the heavy objects. Hoist rings are generally considered to be critical safety items because if a malfunction occurs, a heavy object may be dropped with resultant damage to people, the object, and its surroundings. Accordingly, hoist rings have generally been carefully manufactured with machined mating surfaces to maintain relatively close tolerances.

It is well known that machining operations are expensive in time and materials. Forgings are much quicker and easier to produce with substantially less waste material. It is not possible, however, to hold close tolerances on forged parts. For reasons of strength, the various components in a hoist ring assembly have generally been manufactured by forging operations. The components produced by forging have been considered to be blanks from which the final mating surfaces have been machined to the desired tolerances. It has generally been considered impractical to attempt to assemble the hoist ring assembly components in the as forged condition. Typical tolerances for as forged components are plus or minus sixty thousandths of an inch or more while those for machined parts are plus or minus five thousandths of an inch or less.

Previous hoist ring or eye-bolt assemblies included, for example, those disclosed in Tsui et al., U.S. Pat. No. 4,641,986, patented Feb. 10, 1987. The frusto-conical mating surfaces disclosed there between the pivot pins and the bearing recesses must be machined in order to maintain the required tolerances. The spherical pin ends disclosed there are very difficult to form by forging alone so, a machining operation is necessary to achieve the desired configuration.

These and other difficulties of the prior art have been overcome according to the present invention.

BRIEF SUMMARY OF THE INVENTION

A preferred embodiment of the hoist ring or eye bolt assembly according to the present invention comprises a load engaging anchor assembly and a hoist ring member. The load engaging anchor assembly is adapted to be secured to a load. The "U" or ring shaped hoist ring member is adapted to be secured for pivotal and rotational movement to the load engaging anchor assembly.

The hoist ring member is an integral part forged from a single blank. The opposite ends of the forged hoist ring member are formed into pins or stub shafts which project generally coaxially toward one another so as to define the axis about which the hoist ring member pivots. The ends of the stub shaft members are enlarged and spaced apart. The axially outwardly facing forged surfaces of the enlarged stub shaft members ends extend at steep angles to the pivot or co-axis.

The load engaging anchor assembly includes a fastening member and a forged body or retainer member. The fastening member is adapted to engage a load and to hold the retainer member in operative position adjacent to the load.

The forged retainer member is generally annular in form with a first end, a second end and a longitudinal axis extending generally normal to its ends. The retainer member is forged from a single blank. Retainer sockets are forged on substantially diametrically opposite sides of the retainer member. The retainer sockets are formed with forged radially inwardly facing surfaces. The forged radially inwardly facing surfaces are adapted to mate with the axially outwardly facing forged surfaces of the enlarged stub shaft member ends to retain those enlarged ends in assembly with the retainer member. The respective surfaces are assembled together in the as forged condition. The retainer member is preferably mounted for rotation about its longitudinal axis. This permits the hoist ring member to rotate about the same longitudinal axis. The pivoting of the hoist ring member about the co-axis and its rotation about the longitudinal axis are necessary to permit the hoist ring assembly to adjust to support various loads.

The fastening member generally includes a threaded bolt or stud one end of which is adapted to be threaded into a mating hole in the load. The other end generally includes an enlarged head which provides a bearing shoulder. In order for the hoist ring assembly to be safely mounted the fastening member must be tightly secured to the load. If the fastening member were to be tightened down against the retainer member it would cause this member to bind and thus prevent its rotation about the longitudinal axis.

A bushing member is preferably included in the load engaging anchor assembly for the fastening member to tighten against. In general the bushing member includes a cylindrical portion which is mounted generally concentrically with the longitudinal axis to receive the fastening member axially thereof. The fastening member is generally adapted to bear tightly against the bushing member which causes the bushing member to bear tightly against the surface of the load. The bushing member is thus sandwiched between a bearing surface on the fastening member and the surface of the load. The retainer member is generally provided with an axial bore within which the cylindrical portion of the bushing is received. The bushing preferably includes a head or radially extending flange element which projects outwardly from the cylindrical portion at the end of the bushing which is adapted to bear on the surface of the load. The flange element generally serves two functions. The axially remote first face of the bushing flange element is adapted to bear on the surface of the load to which the hoist ring assembly is attached. This is adapted to spread the force imposed by the tightening of the fastening member over a larger area of the load to which it is attached and thus stabilize the connection between the load and the hoist ring assembly. Also, the axially inward face of the flange which faces the retainer member is preferably configured so as to help maintain the retainer member in the desired assembled configuration. This configuration may, for example, take the form of an annular groove into which a mating annular boss on the retainer member is received. The fastening member may, if desired, include a washer between the head of the threaded bolt and the end of the bushing so as to spread the forces evenly and aid in holding the retaining member in the proper assembled configuration.

It has been found that the first and second ends and the axial bore of the retainer member should preferably be machined square with one another. These machining operations are quick and easy to accomplish and produce a minimum of scrap material as compared with what would be required to machine mating surfaces on the stub shaft and retainer members.

The opposed ends of the stub shaft members are preferably spaced apart by a distance which is slightly greater than the outside diameter of the cylindrical portion of the bushing member. The retainer sockets generally open axially towards the first end of the retainer member and diametrically outwardly. The retainer sockets are closed axially towards the second end of the retainer member by the inwardly facing retainer surfaces. The axially closed ends of the retainer sockets are generally semicircular in form.

During assembly the portions of the forged stub shafts which have reduced diameters are passed through the axially open ends of the retainer sockets until the respective mating forged retainer surfaces are engaged. The bushing member is then added to the assembly to close the axially open ends of the retainer sockets. The fastening member is inserted through the central bore of the bushing member to complete the assembly of the hoist ring assembly. In the assembled configuration the longitudinal or co-axis of the stub shaft members is substantially coextensive with the diameter of the retainer member which is defined by the opposed socket retainer members. Generally the fastening member is secured in position in the central bore by a retainer element such as, for example, a snap ring, so as to hold the hoist ring assembly together when it is not mounted to a load.

The stub shaft portions of the hoist ring member engage the retainer member or body through the mating surfaces on the enlarged ends of the stub shaft members. This engagement serves to hold the hoist ring member together with the rest of the assembly when forces are applied to the hoist ring member. The components of the hoist ring are so formed that the respective mating surfaces on the enlarged ends of the stub shafts and the retainer members are assembled together as forged without the necessity of machining. The configuration which permits the parts to be assembled as forged greatly reduces material and labor costs without any loss of strength or safety. In general, strength is increased as compared with machined parts of the same configuration.

For reasons of strength, safety, and ease of manufacturing the ends or stub shaft members, including the enlarged ends thereon, are formed integrally with the hoist ring member by forging from a single blank. Thus, it has been found necessary to space the juncture between the mating surface and the reduced diameter portion of the stub shaft member from the juncture between the fixed end of the stub shaft member and the balance of the hoist ring member. The juncture between the stub shaft member and the balance of the hoist ring member at the fixed end of the stub shaft usually approximates 90 degrees. It has been found that if reliable, accurate forgings are to be achieved the length of the reduced diameter portion of the stub shaft member must be at least twice that of the enlarged end portion of the stub shaft. That is, the diameters of the stub shaft members at the junctures with the enlarged surfaces is approximately equal to the major diameters of the enlarged surfaces. Also, the forged mating surfaces in the retainer sockets and the enlarged ends should extend at a steep angle of at least approximately 45 degrees to the longitudinal or co-axis of the stub shafts. Shallower angles tend to permit too much axial movement of the stub shafts for a small variation in the relative diameters of the mating surfaces. Where the mating surfaces are arcuate they should extend at such a steep angle at least in the region adjacent to the junction between the reduced diameter and the enlarged end portions of the stub shaft members. The stub shaft members need not have an exact cylindrical form although this configuration is preferred. The diametrically reduced portions of the shaft members need not have constant diameters. Thus, they may taper slightly or they may have a slightly arcuate configuration with or without slight variations in their radial dimensions along the length of their longitudinal axis. The reduced diameter portions of the stub shaft members need not extend coaxially so long as there is a substantially common co-axis in the space between them. The configuration of the mating surfaces causes the hoist ring member to pivot about approximately a single axis.

The respective mating retainer surfaces can be straight or arcuate. According to a preferred embodiment the retaining surfaces in the retainer sockets are concave toroidal surfaces and the mating retained surfaces on the enlarged stub shaft member ends are convex toroidal surfaces which form a torus. The enlarged ends are conveniently proportioned so that the longitudinal projection of the outer surface of the reduced portion of the stub shaft members through the enlarged ends is approximately coextensive with the minor diameter of the torus.

The terms "forging", "forged", and "forge", and similar terms, as used herein are intended to include related operations such as, for example, cold heading. In a cold heading operation the metal is annealed to its softest condition and after cooling the soft metal is formed to the desired configuration in a suitable die. The mating surfaces of both the enlarged ends and the retainer sockets may be formed by cold heading procedures if desired. Other less preferred non-machining forming operations may be used in some limited circumstances where the strength and other requirements will permit it. Thus, the mating surfaces may in some limited circumstances be formed by non-machining operations such as, for example, casting, powder metal techniques and the like.

BRIEF DESCRIPTION OF THE DRAWINGS

Referring particularly to the drawings for the purposes of illustration and not limitation:

FIG. 7 is a side view of the retainer member of FIG. 1.

FIG. 8 is a bottom view of the retainer member of FIG. 1.

FIG. 9 is a partially broken view of the retainer member of FIG. 1.

FIG. 10 is a partially broken view of the bushing member of FIG. 1.

FIG. 11 is a bottom view of the bushing member of FIG. 1.

DETAILED DESCRIPTION OF THE PREFERRED EMBODIMENTS

Figure 1:
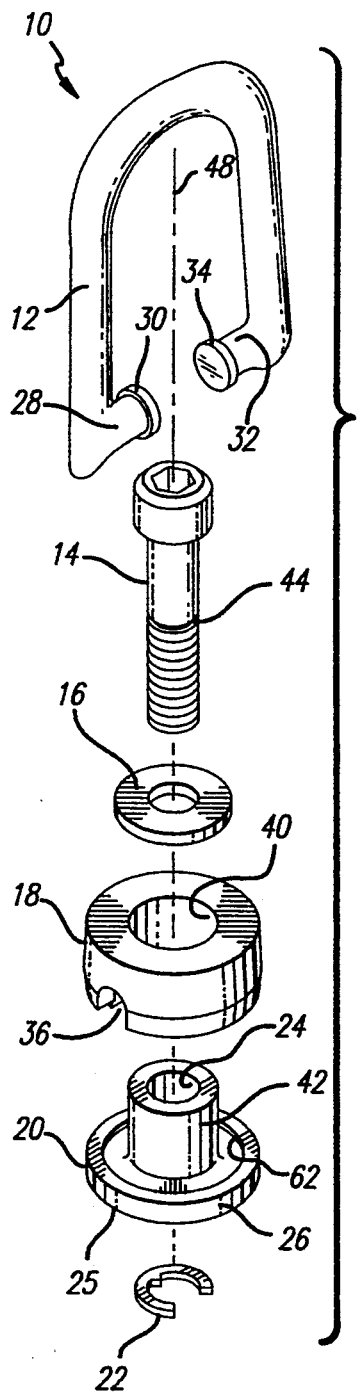
FIG. 1 is a simplified exploded perspective view of a preferred embodiment of the invention.
Figure 2:
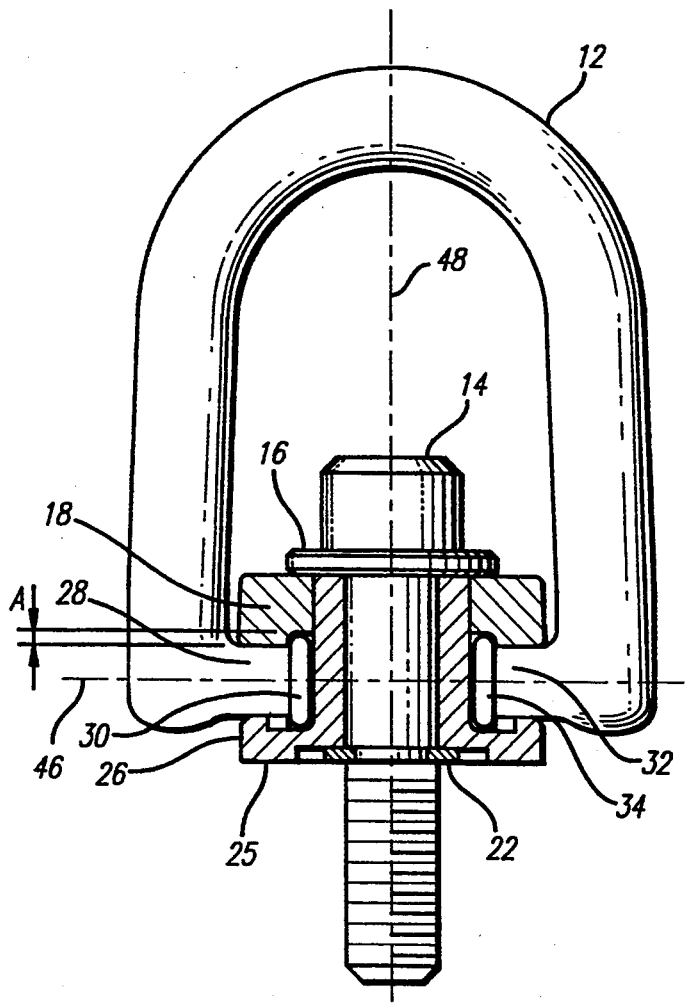
FIG. 2 is an elevational view partially in cross section of the embodiment shown in FIG. 1.
Figure 3:
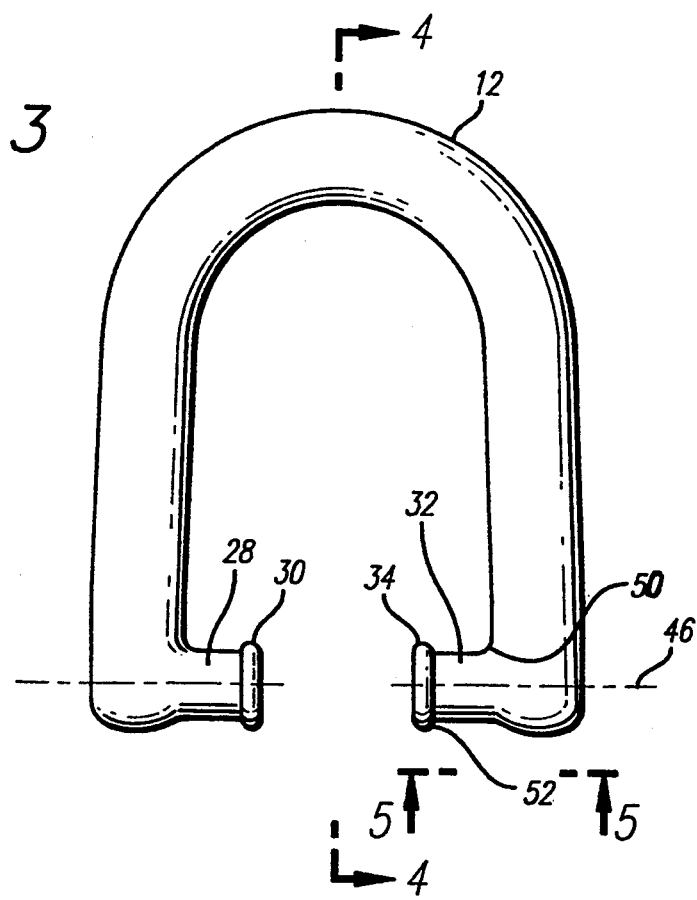
FIG. 3 is an elevational view of the hoist ring member of FIG. 1.
Figure 5:
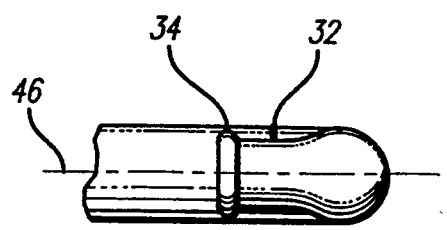
FIG. 5 is a partial bottom view of section 5—5 in FIG. 3.

Referring particularly to the drawings, there is illustrated generally at 10 an exploded hoist ring assembly which includes a forged hoist ring member 12, a threaded fastening member 14, a load distributing washer 16, a forged retainer member 18, a bushing member 20, and a snap ring element 22. The hoist ring assembly 10 is adapted to be mounted by means of threaded fastening member 14 to a threaded hole in a load, not shown. The threaded shaft of fastening member 14 extends through load distributing washer 16, and the central bore 24 of bushing 20. Threaded fastening member 14 extends beyond the remote face 25 of bushing flange 26. Stub shaft member 28 includes enlarged end 30, and stub shaft member 32 includes enlarged end 34. When assembled, large end 30 is received in retainer socket 36 and enlarged end 34 is retained in retainer socket 38, see for example FIGS. 2 and 7-9. The cylindrical portion 42 of bushing member 20 is received in axial bore 40 of forged retainer member 18. Snap ring 22 engages snap ring groove 44 on the shank of fastening member 14 so as to retain the hoist ring assembly 10 in assembled configuration. When assembled to a load and securely tightened thereto, fastening member 14 bears through washer 16 on bushing member 20. Washer 16 serves to retain retainer member 18 in assembled configuration, but does not bear tightly against it. Thus, forged hoist ring member 12 is free to pivot around pivotal or co-axes 46 and to rotate about the longitudinal axes 48. In the preferred embodiment referred to for purposes of illustration, the co-axes 46 extends through both stub shaft members 28 and 32. It is not necessary that co-axes 46 project beyond the enlarged ends 30 and 34 so long as the configuration permits the hoist ring member 12 to pivot smoothly.

Figure 6:
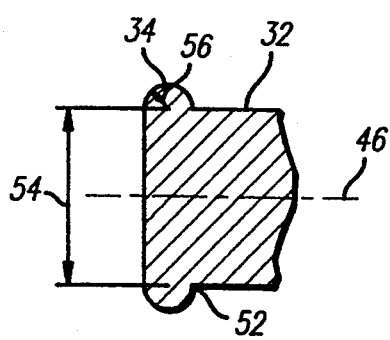
FIG. 6 is a cross-sectional view taken along line 6—6 in FIG. 4.
Figure 4:
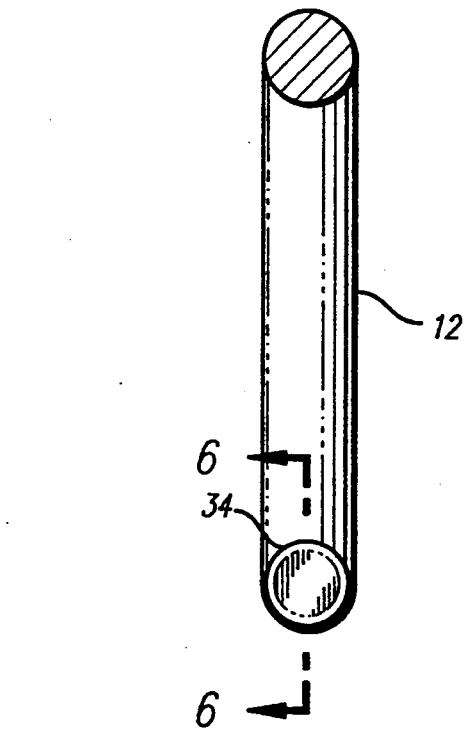
FIG. 4 is a cross-sectional view taken along line 4—4 in FIG. 3.

In the preferred embodiment which has been selected for purposes of illustration, stub shaft members 32 and 28 are substantially identical. Referring to stub shaft member 32 for the purposes of illustration, see particularly FIGS. 2-6, a portion of shaft member 32 has a reduced diameter as compared with the enlarged end. The reduced diameter portion extends from first junction 50 to second junction 52. First junction 50 is between the fixed end of shaft member 32 and the rest of hoist ring member 12. Second junction 52 is between the reduced diameter portion of shaft member 32 and enlarged end 34. In the embodiment chosen for illustration, the axial length of the reduced diameter portion of shaft member 32 between junctions 50 and 52 is approximately 2½ times the axial length of the enlarged end portion of shaft member 32. In the embodiment illustrated, the enlarged end 34 is in the form of a torus which has a toroidal convex surface. The torus has a major diameter 54 which is substantially co-extensive with the major diameter of the reduced portion of stub shaft 32. The minor radius 56 of the convex toroidal surface which defines enlarged end 34, see particularly FIG. 6, is adapted to mate with radially inwardly facing concave toroidal surface 58 in retainer socket 38, see, for example, FIG. 8. Diametrically opposed retainer socket 36 includes concave toroidal surface 60 which is adapted to receive and mate with the convex toroidal surface which is on the axial outside of enlarged end 30. Concave toroidal surfaces 58 and 60 face radially inwardly. In the embodiment illustrated, the lengths of the minor diameters, two times the minor radius A (see FIG. 2), of these concave toroidal surfaces are no more than approximately one third those of the major diameters. In the embodiment illustrated, the portions of the concave surfaces positioned furthest from the longitudinal axis are spaced no more than approximately 1.1 times the length of the minor diameters of the concave torus surfaces from the axial bore. The mating toroidal surfaces on enlarged ends 30 and 34 face axially outwardly along the co-axis. The major diameter 54 and minor radius 56 have been illustrated particularly with respect to an enlarged end with arcuate surfaces but it will be understood that the terminology also applies to other configurations.

Bushing flange 26 on the face opposite remote face 25 is provided with an annular groove 62, see, for example, FIGS. 1 and 10, which is adapted to mate with annular boss 64, see, for example, FIGS. 7-9, to aid in retaining forged retainer member or body 18 in assembled configuration. The retainer sockets 36 and 38 open axially of co-axis 46 so as to permit the insertion of the reduced portion of stub shaft members 28 and 32.

The first end 66 and the second end 68 of forged retainer member 18 are generally machined square with bore 40 so as to ensure the safety of the assembly. The bushing member 20 is generally machined to the desired configuration. These are simple and inexpensive machining operations as compared with machining the mating surfaces of the retainer sockets and enlarged ends.

The remote face 25 of bushing flange 26 is recessed to receive snap ring 22. The remote face 25 is adapted to bear firmly against the surface of a load to which the hoist ring assembly is mounted and the recess in this face is necessary to permit the mounting of snap ring 22.

The as forged mating surfaces have been shown for purposes of illustration as arcuate. It will, however, be understood that straight mating surfaces which extend at angles of greater than 45, and preferably greater than 60, degrees to the co-axis can be employed if desired. In general, arcuate mating surfaces which extend approximately normal to the co-axis 46 at juncture 52 are preferred.

The proportioning of the reduced and enlarged portions of the stub shaft members is such that sufficient mass is provided to serve to retain the enlarged end in the retainer socket while still providing sufficient mass in the retainer member radially outwardly from the retainer socket. Thus, for reasons of ease and reliability of forging as well as strength the axial length of the enlarged end is equal to no more than about one third of the overall axial length of the stub shaft member. This proportioning is evident from an examination of, for example, FIG. 2. In the embodiment illustrated there, the stub shaft members have lengths at least equal to their diameters.

What has been described are preferred embodiments in which modifications and changes may be made without departing from the spirit and scope of the accompanying claims.

What is claimed is:

1. A hoist ring assembly comprising a forged hoist ring member pivotally mounted through integral stub shaft members to an anchor assembly, said stub shaft members being spaced apart and extending generally coaxially of one another from opposite ends of said hoist ring member, said anchor assembly including a fastening member adapted to secure said hoist ring assembly to a load, a generally annular retainer member having a first end, a second end, a generally axial bore, and a pair of generally diametrically disposed retainer sockets forged therein, said retainer sockets opening axially of said retainer member toward said first end and radially outwardly, said retainer sockets being closed toward said second end by forged generally semicircular radially inwardly facing retainer surfaces, and a bushing including a central bore adapted to receive said fastening member axially thereof, said bushing being adapted to be received in said axial bore, said bushing having a generally circumferential flange adapted to cooperate with said first end to close the axially open ends of said retainer sockets, said fastening member having an enlarged head the diameter of which is greater than the diameter of said central bore, said stub shaft members terminating in enlarged forged elements, said enlarged forged elements being adapted to be received in said retainer sockets and to mate with said retainer surfaces as forged, said enlarged forged elements being spaced from the opposite ends of said hoist ring by an amount at least equal to approximately twice their axial length, and said enlarged forged elements being spaced apart by an amount approximately equal to the diameter of said generally axial bore.

2. A hoist ring assembly of claim 1 wherein the co-axis defined by said stub shaft members generally extends approximately normal to said axial bore, and said hoist ring member being adapted to be mounted for pivotal movement around said co-axis.

3. A hoist ring assembly of claim 1 wherein said fastening member is adapted to bear on said bushing and said bushing is adapted to bear on said load, said retainer member being substantially free to rotate about said axial bore, whereby said hoist ring member is mounted for rotational movement around said fastening member.

4. A hoist ring assembly of claim 1 wherein said first and second ends are machined substantially parallel to one another and substantially normal to said axial bore.

5. Process of forming a hoist ring assembly comprising:

forging a hoist ring member having remote ends formed into integral stub shaft members, said stub shaft members extending generally coaxially with and spaced from one another to define a co-axis, said stub shaft members terminating in enlarged forged surfaces the major diameters of which extend generally normal to said co-axis, said stub shaft members having a length at least equal to their diameters, the diameters of said stub shaft members at the junctures with said enlarged surfaces being approximately equal to the major diameters of said enlarged surfaces, the ends of said stub shaft members being spaced apart by a distance about equal to the distance between said enlarged forged surfaces, said enlarged forged surfaces being spaced from the opposite ends of said hoist ring member by an amount at least equal to approximately twice their axial length;

forging a generally annular retainer member having a first end, a second end, a longitudinal axis, and including forged retainer sockets, said retainer sockets being generally diametrically opposed to one another and including radially inwardly facing forged retaining surfaces, said retaining surfaces being adapted to mate with said enlarged surfaces as forged;

placing said as forged enlarged surfaces in said forged retainer sockets in mating contact with said as forged retainer surfaces to form a hoist ring member-retainer member assembly; and assembling said hoist ring member-retainer member assembly into a hoist ring assembly.

6. Process of claim 5 including forming an axial bore in said retainer member extending generally concentric with said longitudinal axis, and machining said first and second ends, whereby said first and second ends extend substantially normal to said axial bore.

7. Process of claim 5 including combining said hoist ring-retainer assembly with a fastening member extending generally along said longitudinal axis surrounded by a bushing, whereby said hoist ring member is free to pivot about said co-axis and to rotate about said longitudinal axis.

8. A hoist ring assembly comprising a forged hoist ring member having remote ends formed into integral stub shaft members, said stub shaft members extending generally coaxially with and spaced from one another to define a co-axis therebetween, said stub shaft members terminating in enlarged forged convex torus surfaces the major diameters of which extend generally normal to said co-axis, the diameters of said stub shaft members at the junctures with said enlarged surfaces being approximately equal to the major diameters of said convex torus surfaces, said stub shaft members being spaced apart by an amount about equal to the distance between said enlarged surfaces;

a forged generally annular retainer member having a first end, a second end, an axial bore generally concentric with a longitudinal axis, and including forged retainer sockets, said retainer sockets being generally diametrically opposed to one another and including concave torus surfaces facing generally towards said longitudinal axis, said enlarged forged convex torus surfaces being adapted to be received in said retainer socket, said concave torus surfaces being adapted to mate with said convex torus surfaces as forged to form a hoist ring member-retainer member assembly, the lengths of the minor diameters of said concave torus surfaces being no more than approximately one third those of the major diameters; and a fastening member adapted to extend through said axial bore to secure said hoist ring member-retainer member assembly to a load.

9. A hoist ring assembly of claim 8 wherein the enlarged ends of said stub shaft members terminate in generally planar surfaces having diameters approximately equal to the major diameters of said convex torus surfaces.

10. A hoist ring assembly comprising a forged hoist ring member having remote ends formed into integral stub shaft members, said stub shaft members extending generally coaxially with and spaced from one another to define a co-axis, said stub shaft members having reduced portions terminating in enlarged ends, the reduced portions of said stub shaft members having a length at least equal to about twice the length of said enlarged ends, said enlarged ends having forged retainer engaging surfaces;

a forged generally annular retainer member having a first end, a second end, an axial bore, a longitudinal axis, and including forged retainer sockets, said retainer sockets being generally diametrically opposed to one another and including forged retainer surfaces facing generally towards said longitudinal axis, said enlarged ends being adapted to being received in said retainer sockets, said retainer surfaces being adapted to mate as forged with said retainer engaging surfaces to form a hoist ring member-retainer member assembly, said retainer and retainer engaging surfaces extending at an angle to said co-axis of greater than approximately 45 degrees, said enlarged ends being spaced apart by an amount about equal to the diameter of said axial bore; and a fastening member adapted to extend through said axial bore to secure said hoist ring member-retainer member assembly to a load.

11. A hoist ring assembly of claim 10 wherein said surfaces extend at an angle to said co-axis of greater than approximately 60 degrees.

12. A hoist ring assembly comprising a hoist ring member having remote ends formed into integral stub shaft members, said stub shaft members extending generally coaxially with and spaced from one another to define a co-axis, said stub shaft members having reduced portions terminating in non-machining formed enlarged ends, the reduced portions of said stub shaft members having a length at least equal to about twice the length of said enlarged ends, said enlarged ends having forged retainer engaging surfaces;

a generally annular retainer member having a first end, a second end, an axial bore, a longitudinal axis, and including non-machining formed retainer sockets, said retainer sockets being generally diametrically opposed to one another and including retainer surfaces facing generally towards said longitudinal axis, said retainer surfaces defining concave torus surfaces having predetermined minor diameters, said enlarged ends being adapted to being received in said retainer sockets, said retainer surfaces being adapted to mate with said retainer engaging surfaces as formed to form a hoist ring member-retainer member assembly, said retainer and retainer engaging surfaces extending at an angle to said co-axis of greater than approximately 45 degrees, the distance along said co-axis from the radially outermost part of a said retainer surface to said axial bore being no more than about 1.1 times the length of said minor diameters; and a fastening member adapted to extend through said axial bore to secure said hoist ring member-retainer member assembly to a load.

* * * * *